United States Patent
Ali

(12) 
(10) Patent No.: US 6,392,883 B1
(45) Date of Patent: May 21, 2002

(54) HEAT EXCHANGER HAVING PHASE CHANGE MATERIAL FOR A PORTABLE COMPUTING DEVICE

(75) Inventor: Andre Ali, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/608,825

(22) Filed: Jun. 30, 2000

(51) Int. Cl.[7] .............................................. G06F 1/20
(52) U.S. Cl. ..................... 361/687; 361/700; 361/704; 165/86; 165/165; 174/15.2; 364/708.1
(58) Field of Search ................................. 361/683, 687, 361/694–703, 704, 717–719, 689; 257/706–727; 165/80.3, 106.33, 80.6, 185, 104.21–104.26, 80.5, 86, 165; 364/708.1; 29/832, 841, 854, 729, 739; 62/259, 2, 418, 419, 426; 437/209, 221, 222; 438/106, 118, 584, 675; 417/92, 377, 13, 44.8, 366; 174/15.1, 15.2, 16.3; 415/114, 177, 178

(56) References Cited

U.S. PATENT DOCUMENTS

| | | | | |
|---|---|---|---|---|
| 4,585,572 A | * | 4/1986 | Lane et al. | 252/70 |
| 5,315,154 A | * | 5/1994 | Elwell | 257/707 |
| 5,455,458 A | * | 10/1995 | Quon et al. | 257/714 |
| 5,606,341 A | * | 2/1997 | Aguilera | 345/87 |
| 5,634,351 A | * | 6/1997 | Larson et al. | 62/259.2 |
| 5,755,988 A | * | 5/1998 | Lane et al. | 252/70 |
| 5,764,483 A | * | 6/1998 | Ohashi et al. | 361/699 |
| 5,796,581 A | * | 8/1998 | Mok | 361/687 |
| 5,847,925 A | * | 12/1998 | Progl et al. | 361/687 |
| 5,880,929 A | * | 3/1999 | Bhatia | 361/687 |
| 6,069,791 A | * | 5/2000 | Goto et al. | 361/687 |
| 6,075,696 A | * | 6/2000 | Progl et al. | 361/687 |
| 6,097,597 A | * | 8/2000 | Kobayashi | 361/687 |
| 6,104,611 A | * | 8/2000 | Glover et al. | 361/700 |
| 6,122,166 A | * | 9/2000 | Mochizuki et al. | 361/687 |
| 6,175,493 B1 | * | 1/2001 | Gold | 361/687 |

FOREIGN PATENT DOCUMENTS

| | | | | |
|---|---|---|---|---|
| JP | 40808-73 | * | 4/1996 | G06F/1/20 |
| JP | 40901-62 | * | 1/1997 | G06F/1/20 |
| JP | 41120-29 | * | 7/1999 | G06F/1/20 |

\* cited by examiner

*Primary Examiner*—Leo P. Picard
*Assistant Examiner*—Michael Datskovsky
(74) *Attorney, Agent, or Firm*—Blakely, Sokoloff, Taylor & Zafman LLP

(57) ABSTRACT

An heat exchanger having a first heat transfer element having thermally coupled to an electronic component, and a heat dissipation mechanism coupled to the heat transfer element. The heat dissipation mechanism includes a chamber of phase change material to dissipate heat generated by the electronic component.

16 Claims, 5 Drawing Sheets

HEAT EXCHANGER HAVING PHASE CHANGE MATERIAL FOR A PORTABLE COMPUTING DEVICE

FIELD OF THE INVENTION

The present invention pertains to the field of the heat removal from electronic components. More particularly, this invention relates to heat removal from a portable computing device.

BACKGROUND OF THE INVENTION

Faster and more powerful computer components allow the design and construction of higher performance portable computing devices such as laptop or notebook computers. Unfortunately, the use of such faster and more powerful computer components often results in increased heat generation by such computing devices. Thus, improved heat dissipation technology is often needed to maintain operating temperatures of portable computing devices within the same range as their predecessors or some other acceptable range.

A portable computing device typically includes a base and a screen which are rotatably attached by a hinge. The base usually has an input device such as a keyboard or a touchpad as well as a number of electronic components. Integrated circuits with the highest clock frequency are typically located in close proximity to each other within the computer base.

Many heat generating computer system components take the form of integrated circuits. Such integrated circuits are typically mounted on a motherboard or another circuit board within the base the portable computer system. A processor is one component that generates a large amount of heat in a typical processor system. Other electrical components which also generate heat include memory circuits, power supply circuits, and circuit boards such as video card.

Maintaining operating temperatures of computer system components below certain levels is important to ensure performance, reliability, and safety. Most integrated circuits have specified maximum operating temperatures, above which the manufacturer does not recommend operation. Transistors, the building blocks of integrated circuits, tend to slow down as operating temperature increases. Thus, a computer system that operates its integrated circuits close to or beyond recommended timings may fail as temperature increases.

Additionally, integrated circuits may be physically damaged if temperatures elevate beyond those recommended. Such physical damage obviously can impact system reliability. Finally, the computer system casing should be kept at a temperature which is safe for human contact. This may necessitate spreading of heat throughout a computer system base or efficiently expelling heat to avoid hot spots near certain components such as a processor.

Typically, heat sinks, fans, and heat pipes are employed to dissipate heat from integrated circuits and other electronic components. Increases in heat generation are often accommodated by simply increasing the quantity or size of these heat dissipation elements. The relatively small size of a portable computing device, however, complicates heat dissipation by limiting airflow, crowding heat generating components, and reducing the space available for heat dissipation devices.

As a result, there exist a need to overcoming, or at least reducing the effects of, one or more of the problems set forth above.

BRIEF DESCRIPTION OF THE FIGURES

The present invention is illustrated by way of example and not limitation in the figures of the accompanying drawings.

FIG. 4b is an enlarged side view of the hinge assembly shown in FIG. 4a.

DETAILED DESCRIPTION

The present invention provides a heat exchanger that includes a phase change material coupled to a heat generating component to dissipate heat generated by the component. In the following description, numerous specific details, such as component types, heat dissipation device sizes, and heat dissipation component mounting structures, and locations are set forth in order to provide a more thorough understanding of the present invention. It will be appreciated, however, by one skilled in the art that the invention may be practiced without such specific details.

The present invention provides numerous solutions to remove heat from a portable computing device through use of a heat exchanger that includes phase change material coupled to a heat generating component to dissipate heat generated by the component. With the ability to remove additional heat, it may become possible to operate components such as a processor in a portable computing device at a higher power level by either increasing the supplied voltage, reducing clock throttling, or increasing the operating frequency of the processor. As a result, a portable computing device may be able to obtain higher performance when a heat exchanger as described below is provided in the computing device.

Figure 1:
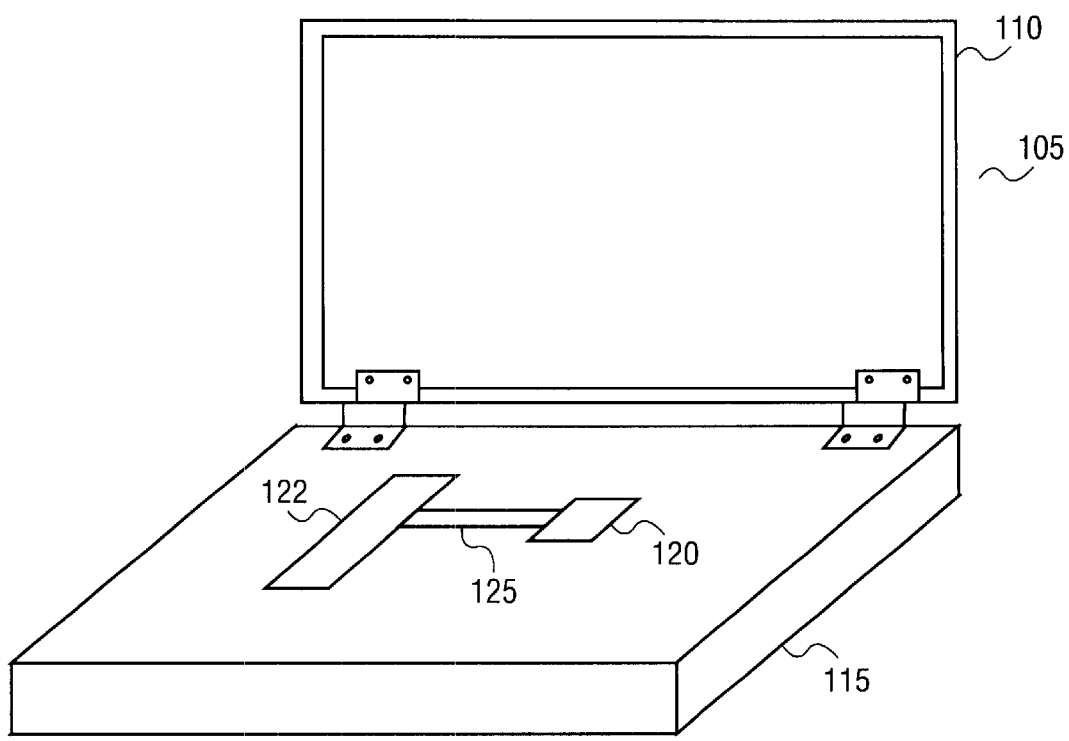
FIG. 1 illustrates a front perspective view of one embodiment of a portable computing device according to one embodiment.

In one embodiment, as shown in FIG. 1, the electronic component 120 is a processor; however, other components or regions of the portable computing device may be cooled according to the present invention. In a typical laptop or notebook computer, many other components are present. A memory system, a disk and/or CD ROM drive, audio and video hardware, connectivity (i.e., network and modem) hardware, as well as a power supply may all be present. These or other individual components as well as circuit boards or regional heat sinks within the portable computing device 105 may be cooled according to the present invention.

Figure 2A:
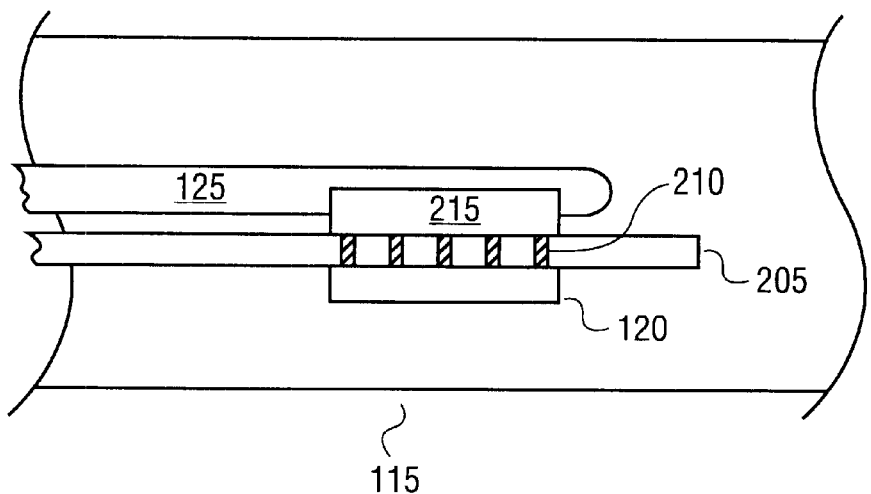
FIG. 2a illustrates a partial cross section elevation view of the connection of a heat transfer element to an electronic component according to one embodiment.

A first portion near one end of the heat transfer element 125 is thermally coupled to the electronic component 120. FIG. 2a illustrates the thermal coupling of the electronic component 120 to the heat transfer element 125. The electronic component 120 is mounted on one side of a motherboard 205 and may be thermally coupled to the heat transfer element 125 via several heat conducting components. In the embodiment of FIG. 2a, the heat conducting components include motherboard vias 210 and a heat conducting block 215. In one embodiment, the block 215 is an aluminum block and the vias 210 are filled with solder. The heat transfer element 125 is affixed to the heat conducting block 215 using solder, thermal epoxy, or other suitable means as are known in the art. This type of mounting may be preferable if the electronic component does not have a rigid package which can withstand a direct connection with the heat transfer element 125.

Figure 2B:
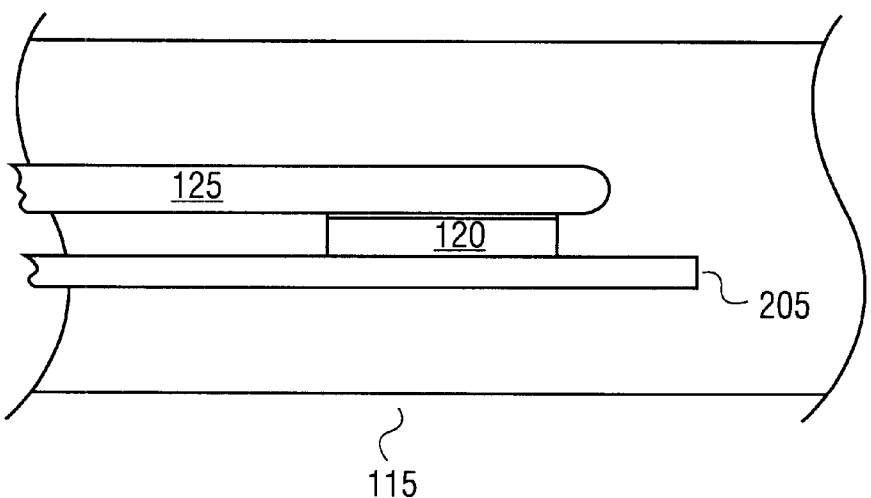
FIG. 2b illustrates a partial cross section elevation view of the connection of a heat transfer element to an electronic component according to another embodiment.

FIG. 2b illustrates another embodiment in which the heat transfer element 125 is directly mounted on an outer surface of the electronic component 120 using a thermal epoxy, solder, or similar means. The inner surface of the component is affixed to the motherboard 205. Either of these types of connections may be used as well as any other means of thermally coupling the electronic component 120 and the heat transfer element 125.

An end portion of the heat transfer element 125 is coupled to a chamber having phase change material (PCM). The phase change material receives heat generated by the electronic component 120 via the heat transfer element 125. The phase change material absorbs the thermal energy generated by the electronic component 120 and stores it within molecules while the phase change material reaches a melting temperature (i.e., phase change temperature.) After a phase change has taken place and the phase change material solidifies, the thermal energy previously stored is released.

In one embodiment, the phase change material used in the thermal heat exchanger of the present invention, may be selected from paraffin, hydrated salt, or an organic acid. In alternative embodiments, other phase change materials can be used without departing from the invention.

Furthermore, the chamber storing the phase change material, in one embodiment, is sealed and is made of epoxy polymer. Moreover, considering when the phase change material changes its state from solid to liquid its volume increases, the chamber is larger than the volume of the phase change material stored in the chamber. In one embodiment, the chamber includes fins to further help in the dissipation of the heat as released from the phase change material.

In one embodiment, as shown in FIG. 1, the chamber of the phase change material 122 is provided in the base of the computing device. In a second embodiment, the chamber of the phase change material is provided in the lid of the portable computing device as shown in FIG. 3.

Figure 3:
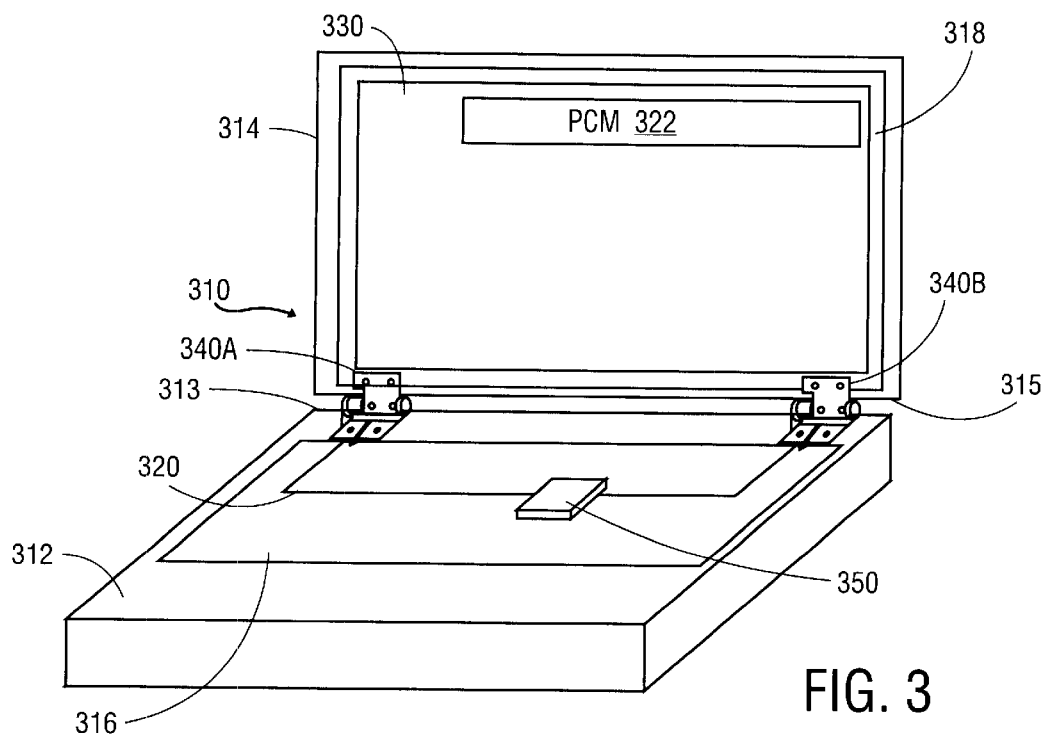
FIG. 3 illustrates a front perspective view of a hinged computing device and the heat exchange system according to one embodiment.
Figure 5:
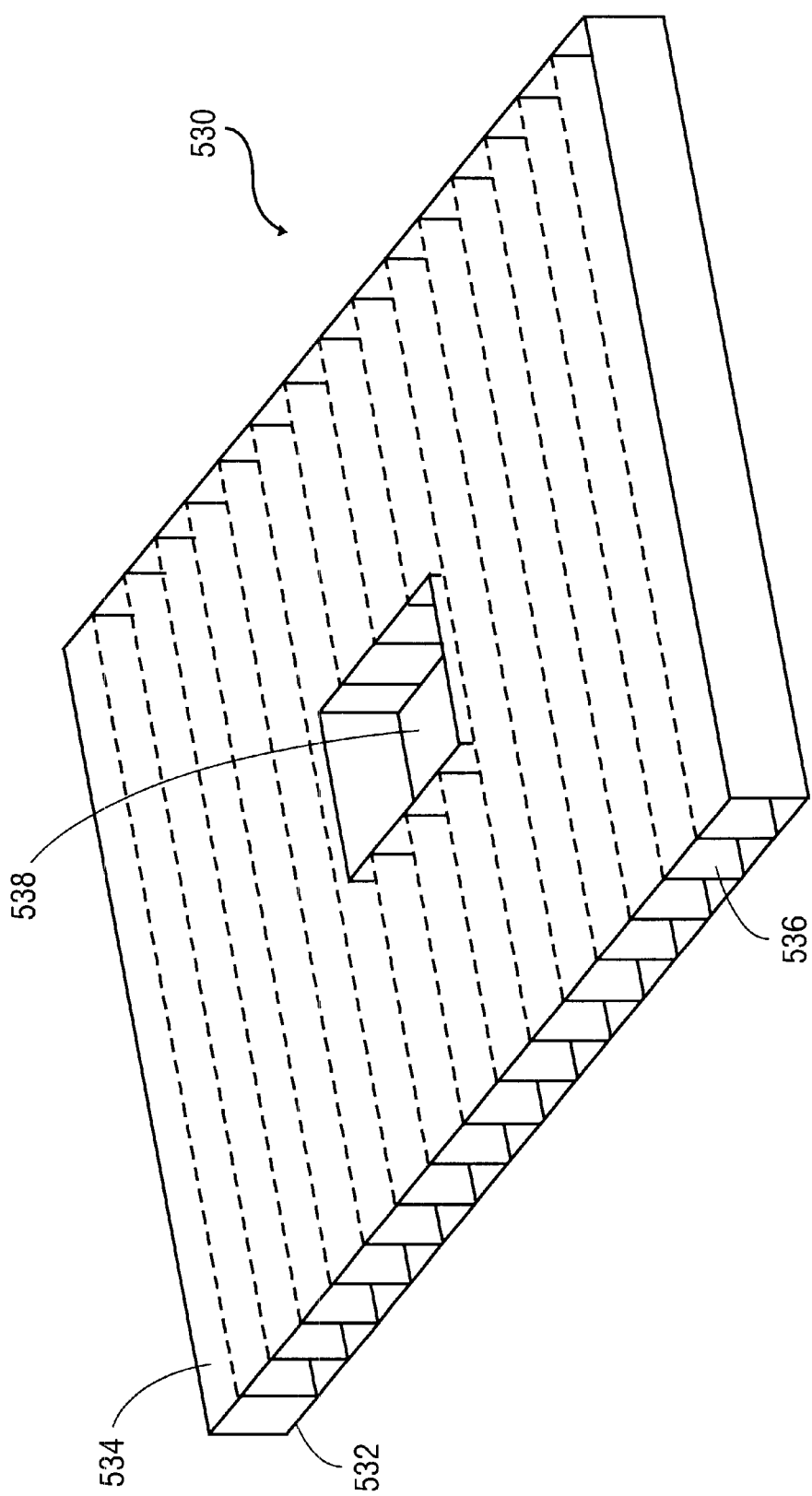
FIG. 5 is a schematic a flat plate heat pipe with an optional square throughhole in the middle for use in one embodiment.

In FIG. 3, the heat exchanger system shown includes a heat pipe 320 located in a first part 312 of the computing device 310, and a flat plate heat pipe 330 with a chamber of PCM 322 are located in a second part 314 of the computing device 310. The heat pipe 320 is thermally coupled to an electronic component 350 in the first part 312 of the computing device 310. The heat pipe 320 is also thermally coupled to a hinge 340, which rotatably couples the first and second parts 312, 314 of the computing device 310 together. The flat plate heat pipe 330 is mechanically and thermally coupled to the hinge 340. The chamber of PCM 322 is mechanically and thermally coupled to the flat heat pipe 330. Details of the heat pipe 320 and flat plate heat pipe 330 is shown in FIG. 5.

The first and second housing members 312, 314 are rotatably attached along the first and second edges 313, 315 by the hinge 340. FIG. 3 shows two hinges 340a, 340b being used, which is common in notebook computers. Use of a single hinge, or multiple hinges is also contemplated. The first housing member 312 may be a base housing member that houses the electronic components and input devices, such as the keyboard 316, of the computing device 310, and the second housing member 314 may be a display housing for holding a display screen.

The base member 312 houses a number of heat generating electronic components (for example graphics and memory chips), including a Central Processing Unit (CPU) 350. The heat generated by these components is removed from the area of the base 312 to help prevent damage to the components from overheating. This heat can be removed by thermally coupling the heat pipe 320 to one or more of the electronic components, such as the CPU 50, in the base 312. The ends of the heat pipe 320 are thermally coupled to the hinges 340a, 340b to effectively transfer heat from the electronic components to the hinges 340.

Referring again to FIG. 3, the display housing 314 includes a display 318, such as an LCD screen, and the flat plate heat pipe 330 is positioned between the display 318 and housing 314. Coupled to the flat plate heat pipe 330 is the chamber of PCM 322.

Since the available area for heat dissipation equals the area of the display housing 314, it is relatively large. Thus, the plastic temperature behind the display needs to be raised over the ambient temperature by a small amount. For example, a flat heat pipe that is 10° C. over ambient temperature can dissipate 8 W of power generated by the CPU 350 and transferred to the flat plate heat pipe 330 through the heat pipe 320 and the hinge 340. Thus, the placement of the flat plate heat pipe 330 adjacent the plastic display housing 314 has a negligible effect on the thin film transistor (TFT) life.

Shown in FIG. 5, the flat plate heat pipe 530 according to one embodiment includes first and second thin flat plates 532, 534 bonded together, such as by roll bonding. A wick structure 536 is sandwiched between the two plates 532, 534. An optional hole 538 may be cut in any location of the flat plate heat pipe 530 to provide clearance for any components that may be present. The flat plate heat pipe 530 may alternatively be formed by direct extrusion of a rectangular cross-section with a wick structure (not shown) or by combining an array of small heat pipes. A variety of types of wick structures, such as machined grooves, etched channels, screens, wires, etc., can be employed.

A flat plate heat pipe 530 is mechanically more rigid than other heat exchange structures of the same material thickness due to the bonding of the first and second thin flat plates 532, 534 forming the heat pipe 530. The flat plate heat pipe 530 may be formed from a variety of lightweight, thermally conductive metal, such as aluminum.

Figure 4A:
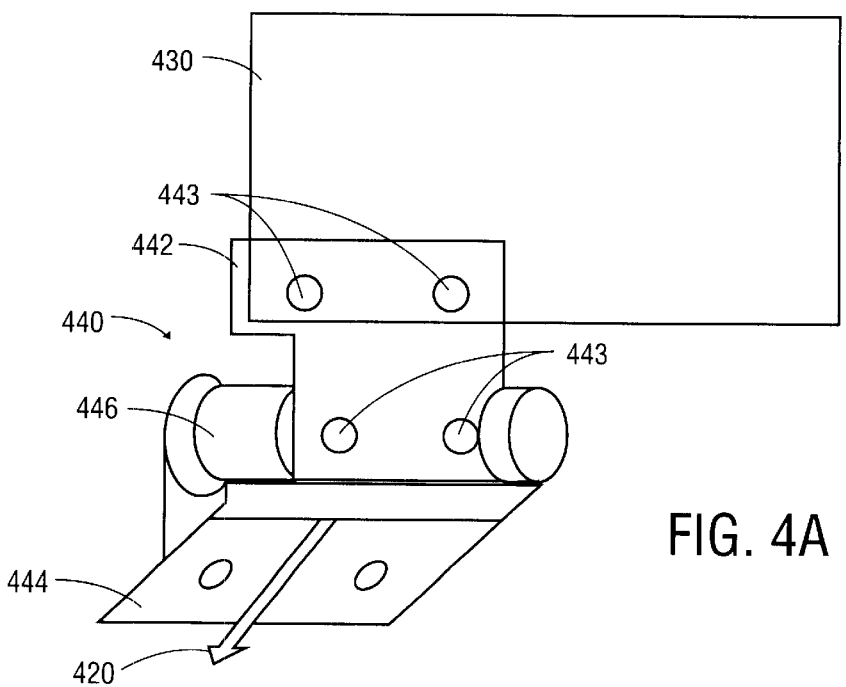
FIG. 4a is an enlarged view of one of the hinge assemblies according to one embodiment.
Figure 4B:
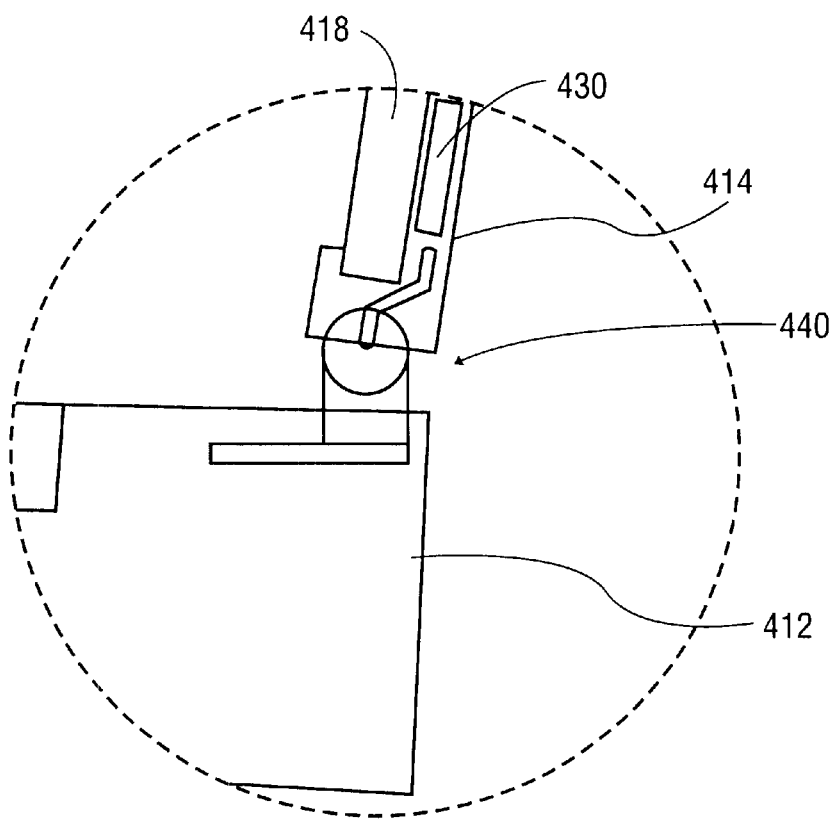

The flat plate heat pipe 330 is mechanically and thermally connected to the hinges 340a, 340b that couple the base 312 to the display housing 314. The hinges 340a, 340b not only allow rotational motion between the base 312 and display housing 314, but also transfer heat between the heat pipe 320 and flat plate heat pipe 330. FIGS. 4a–b show the details of the mechanical hinge 40 according to one embodiment. Hinge configurations other than that shown in FIG. 3 are contemplated. Because of the relatively large area for heat dissipation at the display housing 14, the hinges 40a, 40b are not required to have an unreasonably small thermal resistance. The hinges may be made of any metallic material that is a reasonably good thermal conductor, such as steel, brass, aluminum, an alloy, or the like.

As shown in FIG. 4a, the hinge 440 includes a top half 442 that is mechanically and thermally coupled to the flat plate heat pipe 430. Fasteners, such as screws or pins 443, can be used to mechanically connect the top hinge half 442 to the flat plate heat pipe 430. A bottom half 444 of the hinge 440 is thermally coupled to an end of the heat pipe 420. The connection between the end of the heat pipe 420 and the hinge 440 may be made by conventional means.

For example, a plate may be connected to the end of the heat pipe 420 by welding and a surface of the plate may be placed into engaging contact with a surface of the bottom half 444 of the hinge 440. The plate may be fastened to be bottom half of the hinge by conventional means, such as by welding or removable fasteners. The top hinge half 442 and bottom hinge half 444 are pivotally connected to one another by a pivot pin 446. The pivot pin 446 is constructed and connected to the top and bottom halves of the hinge so that thermal conductivity from the bottom half 444 to the top half 442 remains within acceptable limits. FIG. 4*b* illustrates an enlarged side view of the hinge assembly according to one embodiment.

Thus, the method and apparatus of the present invention a number of heat exchanger solutions for a portable computing device. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed:

1. A heat exchanger system for transferring heat generated by an electronic component located in a first part of a computing device to a second part, comprising:
    a first heat pipe located in the first part of the computing device and thermally coupled between the electronic component and a hinge, said hinge coupled to said second part of the computing device;
    a second flat plate heat pipe located in the second part of the computing device, said second flat plate heat pipe being thermally coupled to the hinge; and
    a heat dissipation mechanism coupled to the second heat pipe, said heat dissipation mechanism including phase change material to dissipate heat generated by said electronic component by changing from a solid state to a liquid state.

2. The heat exchanger system according to claim 1, wherein the second part of the computing device is a lid of a notebook computer, said lid including a screen.

3. The heat exchanger system according to claim 2, wherein the first heat pipe exhibits a round cross-section.

4. The heat exchanger system according to claim 2, wherein the second heat pipe is a flat plate heat pipe.

5. The heat exchanger system according to claim 2, wherein the second heat pipe is a flat heat pipe and the hinge comprises two hinges, each connected to an end an end of the flat heat pipe.

6. The heat exchanger of claim 5 wherein the phase change material is paraffin.

7. The heat exchanger of claim 5 wherein the phase change material is hydrated salt.

8. The heat exchanger of claim 5 wherein the phase change material is organic acid.

9. A computing device comprising:
    a first heat pipe located in a first part of the computing device and thermally coupled between an electronic component and a hinge, said hinge coupled to a second part of the computing device;
    a second flat plate heat pipe located in the second part of the computing device, said second flat plate heat pipe being thermally coupled to the hinge; and
    a heat dissipation mechanism coupled to the second heat pipe, said heat dissipation mechanism including phase change material to dissipate heat generated by said electronic component by changing from a solid state to a liquid state.

10. The heat exchanger system according to claim 9, wherein the second part of the computing device is a lid of a notebook computer, said lid including a screen.

11. The heat exchanger system according to claim 10, wherein the first heat pipe exhibits a round cross-section.

12. The heat exchanger system according to claim 10, wherein the second heat pipe is a flat plate heat pipe.

13. The heat exchanger system according to claim 10, wherein the second heat pipe is a flat heat pipe and the hinge comprises two hinges, each connected to an end an end of the flat heat pipe.

14. The heat exchanger of claim 13 wherein the phase change material is paraffin.

15. The heat exchanger of claim 13 wherein the phase change material is hydrated salt.

16. The heat exchanger of claim 13 wherein the phase change material is organic acid.

\* \* \* \* \*